United States Patent [19]

Sugasawa

[11] Patent Number: 4,673,194

[45] Date of Patent: Jun. 16, 1987

[54] AUTOMOTIVE SUSPENSION CONTROL SYSTEM WITH SELF-ADJUSTMENT FEATURE

[75] Inventor: Fukashi Sugasawa, Yokohama, Japan

[73] Assignee: Nissan Motor Company, Limited, Yokohama, Japan

[21] Appl. No.: 873,995

[22] Filed: Jun. 13, 1986

[30] Foreign Application Priority Data

Jun. 14, 1985 [JP] Japan .................................. 60-129584

[51] Int. Cl.⁴ ............................................ B60G 11/26
[52] U.S. Cl. ..................................... 280/707; 364/424
[58] Field of Search ............... 280/707, 6 H; 364/424; 267/64.28; 180/41

[56] References Cited

U.S. PATENT DOCUMENTS

| | | | |
|---|---|---|---|
| 4,468,739 | 8/1984 | Woods et al. .......................... | 364/424 |
| 4,593,920 | 6/1986 | Natsume et al. ....................... | 280/707 |
| 4,610,462 | 9/1986 | Kumagai et al. ...................... | 280/707 |
| 4,616,846 | 10/1986 | Furuya et al. ......................... | 280/707 |
| 4,624,476 | 11/1986 | Tanaka et al. ......................... | 280/707 |

*Primary Examiner*—John J. Love
*Assistant Examiner*—Ross Weaver
*Attorney, Agent, or Firm*—Schwartz, Jeffery, Schwaab, Mack, Blumenthal & Evans

[57] ABSTRACT

A suspension control system includes an actuator which adjusts the damping or shock absorbing characteristics of the suspension system among a plurality of predetermined characteristics. Occurrences of actuation of the actuator are counted and the count is compared with a given value to gain a measure of secular variation of the suspension system. When the count exceeds the given value, a reference value used by the suspension control system is adjusted to compensate for secular variation of the suspension system. With this arrangement, the suspension controlling characteristics can be fitted to the condition of the suspension system even after secular variation.

17 Claims, 13 Drawing Figures

AUTOMOTIVE SUSPENSION CONTROL SYSTEM WITH SELF-ADJUSTMENT FEATURE

BACKGROUND OF THE INVENTION

The present invention relates generally to an automatic automotive suspension control system the suspension characteristics can be adjusted to optimize vehicular performance under various vehicle driving conditions. More specifically, the invention relates to an automotive suspension control system with variable vehicle driving condition sensitivity related to secular variation of the suspension system. In more detail, the invention relates to a self-adjusting feature for suspension control characteristics of an automotive suspension control system according to possible secular variation of each individual suspension system.

Recently, suspension control systems controlling the performance of vehicular suspension systems have been used to provide better riding comfort and better vehicle driving ability. Such suspension control systems control the damping characteristics or shock absorbing charcteristics of the vehicular suspension system depending upon various vehicle driving parameters affecting riding comfort and drivability of the vehicle. For example, suspension control systems may adjust suspension characteristics depending upon road condition, vehicle speed, acceleration and deceleration of the vehicle, vehicular roll and so forth. In order to obtain desired suspension control characteristics, the suspension control system receives preselected vehicle driving parameters, compares a value representative of the preselected vehicle driving parameters with a corresponding reference value and adjusts suspension characteristics accordingly.

As is well known, vehicular suspension systems are subject to secular variations in their performance. Secular variation of suspension performance is especially dependent upon the individual habits of the user, i.e. driving style. Therefore, the suspension control system must be adjusted so as to fit the suspension control characteristics to the condition of the suspension system after secular variation in order to maintain adequate control accuracy.

SUMMARY OF THE INVENTION

Therefore, it is an object of the present invention to provide an automotive suspension control system which can automatically adjust suspension control characteristics depending upon the condition of the suspension system.

Another object of the invention is to provide a suspension control system which adjusts control charcteristics depending upon the condition of individual suspension system.

A further object of the invention is to provide a suspension control system which counts occurrences of change of suspension characteristics and adjusts suspension control characteristics depending upon the number of such occurrences.

In order to accomplish the aforementioned and other objects, a suspension control system, according to the present invention, includes an actuator for selecting damping or shock absorbing characteristics of the suspension system from among a plurality of predetermined characteristics. Occurrences of actuation of the actuator are counted and compared with a given value to gain a measure of the secular variation of the suspension system. When the counted number of actuation occurrences exceeds the given value, a reference value used in suspension control is adjusted to compensate for secular variation of the suspension system.

With this arrangement, the suspension control characteristics can be fitted to the condition of the suspension system even after secular variation.

If desired, the suspension control system may also count changes in the inclination of the vehicle to more accurately monitor the condition of the suspension system.

According to one aspect of the invention, an automotive vehicle suspension control system comprises a vehicular suspension system with damping characteristics variable at least between a first mode and a second mode, the latter of which provides harder damping characteristics than the first mode, in response to a control signal, a sensor monitoring a preselected suspension control parameter and producing a sensor signal having a value indicative of a vehicular driving condition represented by the preselected suspension control parameter, first means comparing the sensor signal value with a threshold value and producing the control signal ordering the vehicular suspension system from the first mode to the second mode when the sensor signal value is greater than the threshold value, second means for counting occurrences of the control signal ordering the vehicular suspension system from the first mode to the second mode and producing a counter signal having a value representative of the counted value, and third means for detecting when the counter signal exceeds a first reference value and in such cases, modifying the threshold value so as to lower the sensitivity of suspension control to the sensor signal.

Adjusting the threshold value so as to lower the sensitivity of the control system, the frequency of switching of operational (hardness) mode of the suspension system can be reduced to the normal range and thus compensate for secular variation of the suspension system and the suspension control system itself.

The third means can also detect when the counter signal value drops below a second reference value, and in such cases modify the threshold value to increase the sensitivity of the suspension control to the sensor signal.

This self-adjustment feature raises or lowers the sensitivity of the suspension control to a reasonable level which ensures that the potential and/or efficiency of the suspension control will remain constantly acceptable.

The second means resets and clears its counter value periodically. The first reference value is representative of the greatest possible number of occurrences of the control signal within a counting period defined by the reset-timing of the seocnd means. The second means is assigned a given counting period and is adapted to be reset to clear its counter value at the end of every the counting period, and the second reference value is representative of the lowest possible number of occurrences of the control signal ordering the vehicular suspension system from the first mode to the second mode within the counting period. The third means also detects when the counter signal has a value smaller than a second reference value which is smaller than the first reference value and in such cases increases the sensitivity of suspension control to the second signal, the second reference value being representative of the lowest possible number of occurrences of the control signal ordering the vehicular suspension system from the first mode to the second mode within the counting period of the second means.

This arrangement automatically corrects the sensitivity of the suspension control on a step-by-step basis.

The sensitivity of suspension control is lowered by the third means by increasing the first reference value by a first given value. On the other hand, the sensitivity of suspension control is increased by the third means by decreasing the threshold value by a second given value.

As an alternative, an automotive vehicle suspension control system may also comprise fourth means for comparing the sensor signal value with an auxiliary threshold value, counting occurrences of the sensor signal values exceeding the auxiliary threshold value, and producing an auxiliary counter signal indicative of the counted value, and the third means derives the first given value on the basis of the auxiliary counter signal value. The third means also derives the second given value on the basis of the auxiliary counter signal value.

This arrangement more accurately compensates for secular variation of the suspension system and/or suspension control system according to the vehicle driving conditions.

According to another aspect of the invention, an automotive vehicle suspension control system comprises a vehicular suspension system with damping charcteristics variable at least between a first mode and a second mode, the latter of which provides harder damping characteristics than the first mode, in response to a control signal, a first sensor monitoring a preselected first suspension control parameter and producing a sensor signal having a value indicative of a vehicle driving condition represented by the first suspension control parameter, a second sensor monitoring a preselected second suspension control parameter and producing a second sensor signal having a value indicative of a vehicle driving condition represented by the second suspension control parameter, first means for comparing the first sensor signal value with a first threshold value and producing the control signal ordering the vehicular suspension system from the first mode to the second mode when the first sensor signal value is greater than the first threshold value, second means for comparing the second sensor signal with a second threshold value and producing the control signal ordering the vehicular suspension system from the first mode to the second mode when the second sensor signal value is greater than the second threshold value, third means for detecting the control signal produced by the first means, counting occurrences of the control signal, and producing a first counter signal, fourth means for detecting the control signal produced by the second means, counting occurrences of the control signal, and producing a second counter signal, fifth means for comparing the sum of the first and second counter signal values with a first reference value and modifying at least one of the first and second threshold values when the sum is greater than the first reference value.

The fifth means for comparing the sum with a second reference value and modifying at least one of the first and second threshold values when the sum is less than the second reference value. The fifth means modifies one of the first and second threshold values depending on which of said first and second counter signal values is greater than the other when the sum is greater than the first reference value.

As an alternative, the fifth means may modify both the first and second threshold values by increments derived in proportion to the first and second counter signal values.

The third and fourth means are reset at given regular intervals to clear the first and second counter values to zero.

It should be appreciated that the first and second reference values define a desired normal sensitivity range for suspension control by the automotive vehicle suspension control system.

DESCRIPTION OF THE PREFERRED EMBODIMENT

Figure 1:
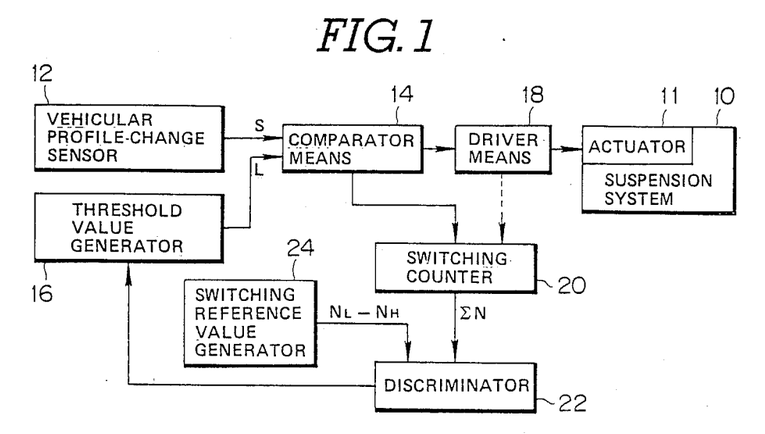
FIG. 1 is a schematic block diagram of the preferred embodiment of a vehicle suspension control system according to the present invention, which automatically adjusts the sensitivity of suspension control.

Referring now to the drawings, particularly to FIG. 1, the preferred embodiment of a suspension control system, according to the present invention, generally comprises a vehicular suspension system 10 associated with an actuator 11 which actuate switches the characteristics of the suspension system among a plurality of operation modes. The suspension control system also comprises a vehicular profile-change sensor means 12 which is designed to monitor vehicle driving parameters such as steering angular variation, throttle valve angular position, brake fluid pressure and so forth. In general, the vehicular profile-change sensor means 12 produces a sensor signal representative of the monitored vehicle driving parameter or paramters and sends the sensor signal to a comparator means 14. The comparator means 14 also receives a threshold indicative signal from a threshold value generator means 16 and compares the sensor signal value with a threshold value. The comparator means 14 outputs a comparator signal based on the difference between the sensor signal value and the threshold value. The comparator signal is sent to a driver means 18 which activates and deactivates the actuator 11 and so switches the operation mode of the suspension system.

A switching counter 20 is also used in the suspension control system. The switching counter 20 counts how often the operational mode changes and holds the counted value. In practice, in order to count occurrences of operational mode change in the suspension system, the switching counter 20 is connected to the comparator means 14, or, alternatively, to the driver means 18, to receive the comparator signal or a driver signal from the driver means. The switching counter 20 outputs a counter signal indicative of the occurrence of an operational mode change to a discriminator 22. The discriminator 22 is also connected to a switching reference value generator means 24 to receive a reference signal. Based on the difference between the threshold value and the counter signal value, the discriminator 24 outputs a discriminator signal to the threshold value generator means 16. Based on the discriminator signal, the threshold value generator means 16 derives the threshold value to be input to the comparator means 14.

In practical operation, the switching reference value generator means 24 provides an upper reference value and a lower reference value which define a predetermined standard or normal range of sensitivity of suspension control. As long as the counter signal value remains within the standard range, the threshold value output by the threshold value generator means 16 remains at a predetermined standard value. On the other hand, if the counter signal value drops below the lower reference value, the threshold value is decreased by a given amount so as to increase the sensitivity of suspension control, i.e. the switching frequency of the operational mode in response to the sensor signal value. On the other hand, when the counter value exceeds the upper reference value, the threshold value is increased by a given value to decrease the sensitivity of suspension control and so decrease the switching frequency of the operational mode in response to the sensor signal value.

Therefore, as will be appreciated herefrom, when the number of operational mode changes is below a lower criterion defined by the lower reference value, a smaller threshold value is used in suspension control in order to cause higher-frequency switching of the operational mode. As a result, the sensitivity of the suspension control system is higher than at standard rates of operational mode change. On the other hand, when the number of operational mode changes exceeds the upper criterion defined by the upper reference value, it is assumed that the sensitivity of the suspension system is too high. In this case, the damping force or shock absorbing characteristics of the suspension system may be recognized as being lower than the original standard level due to secular variation. Therefore, in this case, the sensitivity of the suspension control system is lowered to ensure the accuracy of detection of the vehicle driving conditions and to fit the selected operational mode to the vehicle conditions.

The preferred embodiment of the suspension control system with a self-adjusting feature, according to the present invention, will be described herebelow with reference to FIGS. 2 to 10. However, it should be appreciated that the self-adjusting feature, which is an essential feature of the invention, can be applied to any type of suspension control system which adjusts suspension characteristics by selecting its operational mode from among a plurality of different modes and having a suspension control parameter sensor which yields a value which is then compared with a reference value in order to select an appropriate operational mode of the suspension system from among the mentioned modes. Therefore, the preferred embodiment hereafter disclosed should be appreciated as merely an example of application of the self-adjusting feature to a suspension control system.

Figure 2:
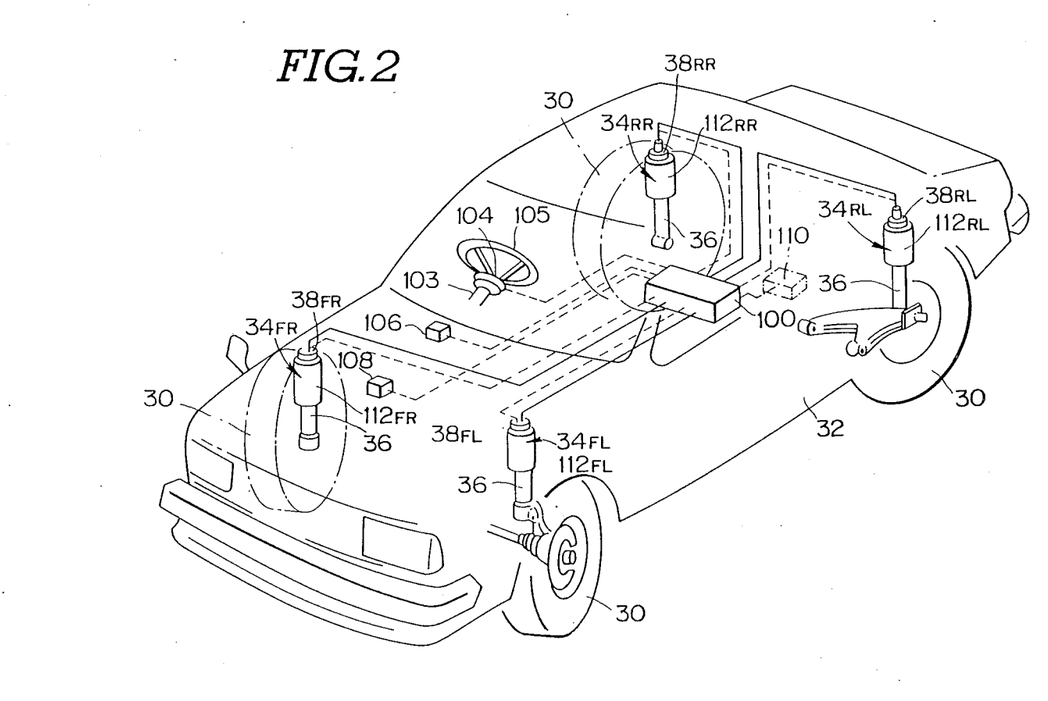
FIG. 2 is a fragmentary illustration of an automotive vehicle and showing arrangement of various components of the preferred embodiment of the vehicle suspension control system.

FIG. 2 illustrates an automotive vehicle to which the preferred embodiment of the suspension control system according to the present invention is applied. The vehicle has left-front, right-front, left-rear and right-rear wheels 30. The wheels 30 support the vehicle body 32 through corresponding suspension assemblies $34_{FL}$, $34_{FR}$, $34_{RL}$ and $34_{RR}$. In the shown embodiment each suspension assembly $34_{FL}$, $34_{FR}$, $34_{RL}$ and $34_{RR}$ has a variable damping-force shock absorber 36 which can operate in any of a plurality of damping modes, including at least a HARD mode in which a relatively high damping force is produced, and a SOFT mode in which a relatively small damping force is produced. In order to switch among the various damping modes, each variable damping-force shock absorber 36 is associated with an actuator $38_{FL}$, $38_{FR}$, $38_{RL}$ and $38_{RR}$. The actuators $38_{FL}$, $38_{FR}$, $38_{RL}$ and $38_{RR}$ are respectively connected to driver circuits $102_{FL}$, $102_{FR}$, $102_{RL}$ and $102_{RR}$. The driver circuits $102_{FL}$, $102_{FR}$, $102_{RL}$ and $102_{RR}$ are connected in turn to a controller 100 which comprises a microprocessor and produces control signals derived from detected vehicle driving conditions.

In order to monitor vehicle driving conditions, the controller 100 is connected for input from a steering angle sensor 104, a throttle angle sensor 106 and a brake fluid pressure sensor 108. Also, the controller 100 may be connected to a vehicle speed sensor 110, vehicle height sensors $112_{FL}$, $112_{FR}$, $112_{RL}$ and $112_{RR}$ and so forth. As is well known, the steering angle sensor 10 is mounted on a steering column 103 to monitor angular displacement of a steering wheel 105 and produces a steering angle indicative signal indicative thereof. The steering angle indicative signal is utilized as a parameter representative of rolling force and/or yawing force exerted on the vehicle. The throttle angle sensor 106 monitors throttle valve angular displacement and thus monitors acceleration and deceleration of the vehicle, both of which causes vehicular profile changes, i.e. winding-up or nose-dive. The throttle angle sensor 106 produces a throttle angle indicative signal representative of the throttle valve angular position. The brake fluid pressure sensor 108 in interposed within a vehicular hydraulic brake circuit for monitoring the pressure therein, and thus monitoring the braking state of the vehicle. The brake fluid pressure sensor 108 produces a brake fluid pressure indicative signal representative of the fluid pressure in the hydraulic brake circuit.

The vehicle height sensors $112_{FL}$, $112_{FR}$, $112_{RL}$ and $112_{RR}$ are arranged to monitor the vehicle height at each wheel 30. The vehicle height sensors $112_{FL}$, $112_{FR}$, $112_{RL}$ and $112_{RR}$ each produce a vehicle height indicative signal for the corresponding wheel.

The controller 100 derives control signals based on the aforementioned various sensor signals.

Suspension control in response to the steering angle indicative signal from the steering angle sensor has been disclosed in the co-pending U.S. patent application Ser. No. 678,806, filed on Dec. 6, 1984, and the corresponding European Patent Application which has been published under Publication No. 01 45 013. Suspension control for suppressing winding-up and nose-dive has been disclosed in the co-pending U.S. patent application Ser. No. 649,484, filed Sept. 11, 1984, the corresponding European Patent Application of which has been published under Publication No. 01 35 902, the co-pending U.S. patent application Ser. No. 791,061, filed on Oct. 24, 1985, and the co-pending Japanese Patent Application No. 59-11734 which has been published under the Publication No. 60-154906. Road condition-dependent and vehicular sway-dependent suspension control have been disclosed in the co-pending U.S. patent application Ser. No. 647,648, filed on Sept. 6, 1986, the co-pending U.S. patent application Ser. No. 706,279, filed on Feb. 27, 1985, the corresponding European Patent Application of which has been published under Publication No. 01 57 181, the co-pending U.S. patent application Ser. No. 744,379, filed on June 13, 1985, the corresponding European Patent Application of which has been published under Publication No. 01 66 313, and the co-pending U.S. patent application Ser. No. 751,513, filed on July 3, 1985, the corresponding European Patent Application of which has been published under Publication No. 01 67 455. All of the above-listed co-pending applications have been assigned to the owner of the present invention. The contents of the listed co-pending applications are hereby incorporated by reference for the sake of disclosure.

Figure 3:
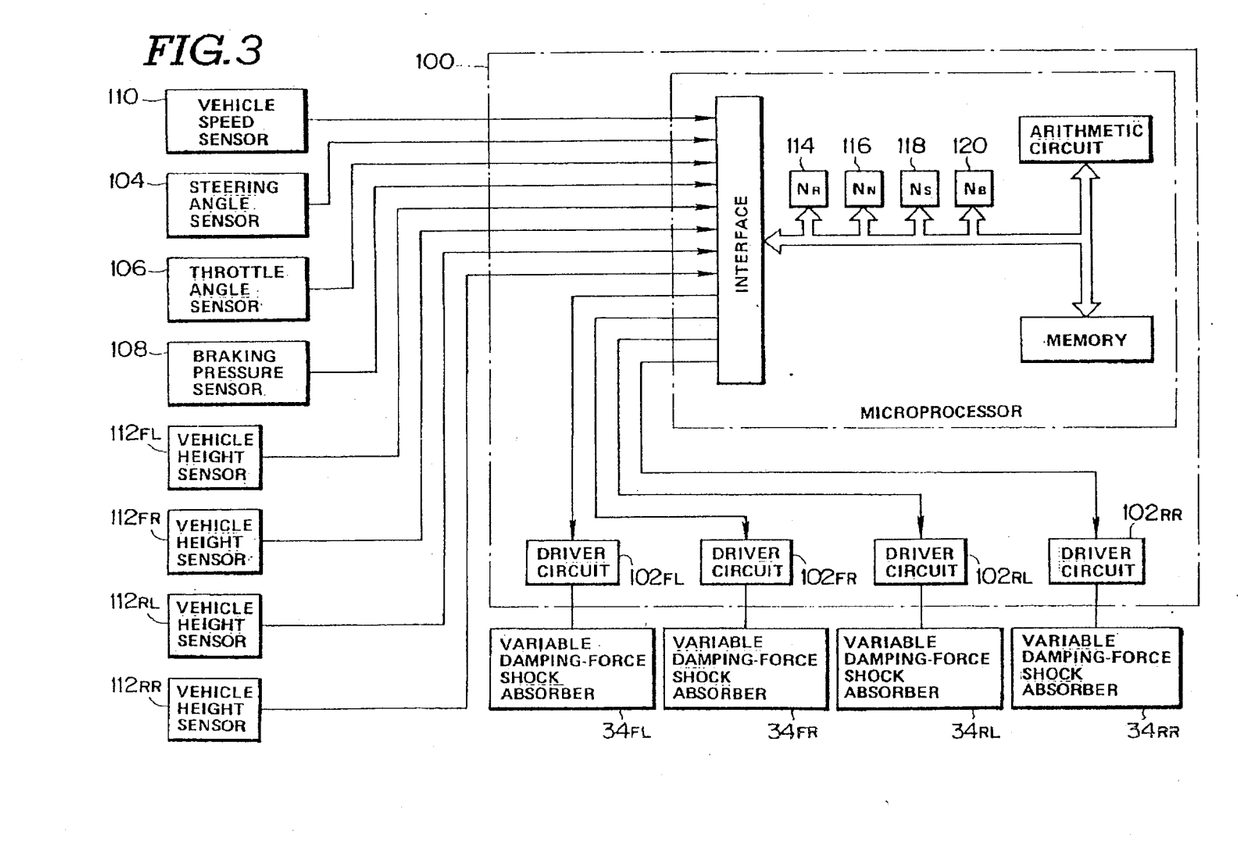
FIG. 3 is a block diagram of the preferred embodiment of a vehicle suspension control system implementing the general ideas illustrated in FIG. 1.
Figure 4:
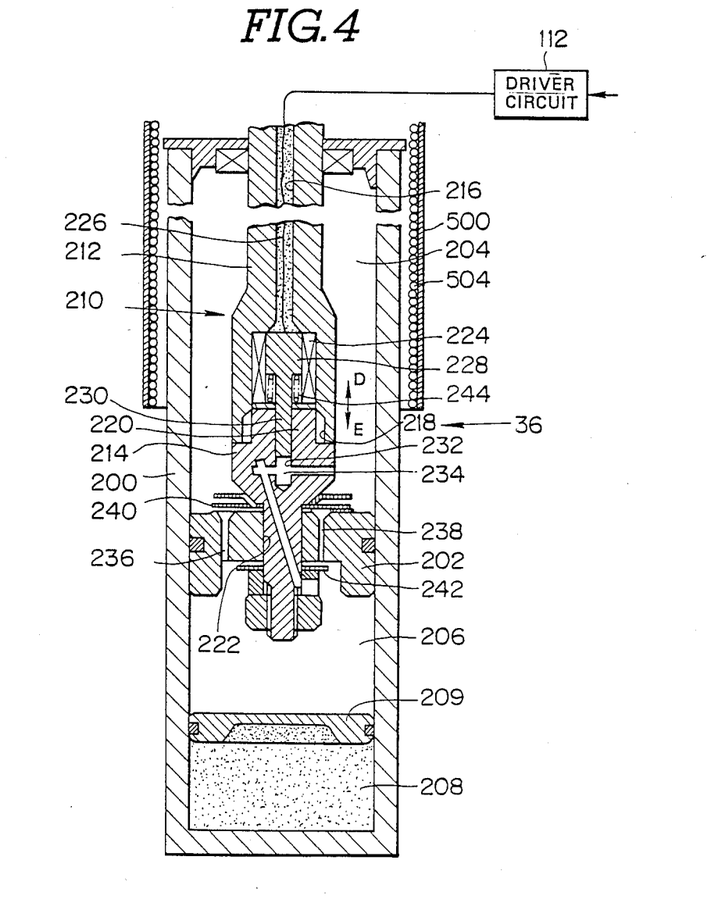
FIG. 4 is a section through a two-way variable damping force shock absorber employed in the preferred embodiment of the vehicle suspension control system.

FIG. 4 shows the first embodiment of the variable damping-force shock absorber 36 employed in the preferred embodiment of the suspension control system of FIGS. 2 and 3. The shock absorber 36 generally comprises a hollow cylinder 200, and a piston 202 fitting flush within the hollow interior of the cylinder 200. The piston 220 defines upper and lower fluid chambers 204 and 206 within the cylinder 200. The cylinder 200 further defines a pneumatic chamber 208 partitioned from the lower fluid chamber 206 by means of a movable disc-shaped partition 209. The pneumatic chamber 208 is filled with a compressed gas.

The piston 202 is connected to the vehicle body (not shown) by means of a piston rod which is generally referred to by the reference number 210. The piston rod 210 comprises upper and lower segments 212 and 214. The upper segment 212 has an axial through opening 216. The lower end of the through opening 216 opens into a recess 218 in the lower end of the upper segment 212. On the other hand, the lower segment 214 has an upper section 220 engageable to the recess 218. A hole 222 is defined in the upper segment 212 of the piston rod 210 to receive an actuator 224 extending through the through opening 216. The actuator 224 is connected to the corresponding driver circuit $102_{FL}$, $102_{FR}$, $102_{RL}$ or $102_{RR}$ through a lead 226. The actuator 224 is associated with a movable valve body 228 which has a lower end extension 230 inserted into a guide opening 232 defined in the lower segment 214. The guide opening 232 extends across a fluid passage 234 through the lower segment 214 for fluid communication between the upper and lower fluid chambers 204 and 206.

The fluid passage 234 serves as a bypass for flow-restrictive fluid passages 236 and 238 in the piston 202. The upper end of the fluid passage 238 is closed by a resilient flow-restricting valve 240. Similarly, the lower end of the fluid passage 236 is closed by a flow-restricting valve 242. The flow-restricting valves 240 and 242 serve as check valves establishing one-way fluid communication in opposite directions. In addition, since the flow-restriction valves 240 and 242 are biased toward the ends of the fluid passages 236 and 238, they open to allow fluid communication between the upper and lower fluid chambers 204 and 206 only when the fluid pressure difference between the upper and lower chambers 204 and 206 overcomes the effective pressure of the valves.

The cross-sectional area of the fluid passages 236 and 238 and the set pressures of the fluidrestriction valves 240 and 242 determine the damping force produced in HIGH damping force mode. The cross-sectional area of the fluid passage 234 determines the drop in the damping force in the LOW damping force mode in comparison with that in the HIGH damping force mode.

The movable valve body 228 is normally biased upwards by means of a coil spring 244. As a result, when the actuator 224 is not energized, the lower end section 230 of the valve body 228 is separated from the fluid passage 234 to allow fluid communication between the upper and lower chamber. When the actuator 224 is energized, the valve body 228 moves downwards against the resilient force of the coil spring 244 to block the fluid passage 234 with the lower end extension 230. As a result, fluid communication between the upper and lower fluid chambers 204 and 206 via the fluid passage 234 is blocked. When fluid communication through the fluid passage is permitted, the damping force produced by the shock absorber 36 remains LOW. On the other hand, when the fluid passage 234 is shut, fluid flow rate is reduced, thus increasing the damping force produced. Therefore, when the valve body 228 is shifted to the lowered position, the shock absorber works in HIGH damping force mode to produce a higher damping force against vertical shocks.

In the normal state wherein the control signal of the controller 100 remains LOW, the movable valve body is held in its upper position by the effect of the spring force so that the lower end extension 230 does not project into the fluid passage 234. Therefore, the fluid communication is established through both the fluid passage 234 and the applicable one of the flow-restricting fluid passages 236 and 238. As a result, the total flow restriction is relatively weak to allow the shock absorber to operate in SOFT mode.

In response to a HIGH-level control signal from a controller 100, the drive signal generator 102 corresponding to each shock absorber 36 becomes active to energize the actuator 224. The actuator 224 drives the movable valve body 228 downward. This downward movement shifts the lower end of the extension 230 of the valve body 228 into the fluid passage 234 so as to block fluid communication between the upper and lower fluid chambers 204 and 206 via the fluid passage 234. Therefore, the fluid can flow between the upper and lower chambers 204 and 206 only through one of the fluid passages 236 and 238. The fluid flow restriction is, thus, increased, resulting in a greater damping force than is produced in the SOFT mode. In other words, the shock absorber 36 operates in HARD mode.

FIGS. 5 to 8 show a modified form of the variable-damping-characteristic shock absorber of FIG. 4. In this modification, the shock absorber 36 can be operated in any of three modes, namely HARD mode, SOFT mode and MEDIUM mode, in the last of which damping characteristics intermediate to those of HARD mode and SOFT mode are achieved.

Figure 5:
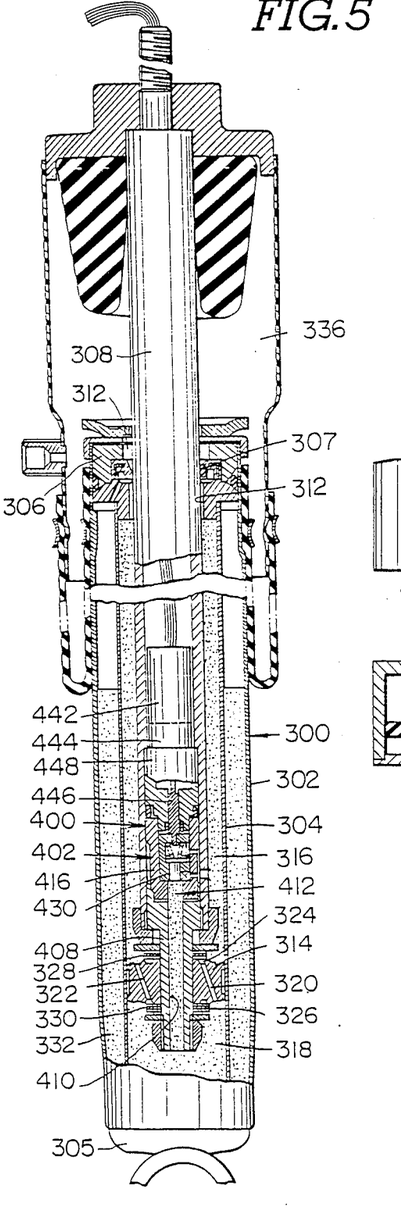
FIG. 5 is a section through a three-way adjustable variable damping force shock absorber.

The hydraulic shock absorber 36 has coaxial inner and outer cylinders 302 and 304. Top and bottom ends of the cylinders 302 and 304 are plugged with fittings 306 and 305. The fitting 306 includes a seal 307 which establishes a liquid-tight seal. A piston rod 308 extends through an opening 12 formed in the fitting and is rigidly connected to a vehicle body (not shown) at its top end. The piston rod 308 is, in turn, connected to a piston 314 reciprocally housed within the inner cylinder 302 and defining upper and lower fluid chambers 316 and 318 therein.

The piston 314 has fluid passages 320 and 322 connecting the upper and lower fluid chambers 316 and 318. The piston 314 also has annular grooves 324 and 326 along its upper and lower surfaces concentric about its axis. The upper end of the fluid passage 320 opens into the groove 324. On the other hand, the lower end of the fluid passage 322 opens into the groove 326. Upper and lower check valves 328 and 330 are provided opposite the grooves 324 and 326 respectively to close the grooves when in their closed positions. The lower end of the fluid passage 320 opens onto the lower surface of the piston at a point outside of the check valve 330. Likewise, the upper end of the fluid passage 322 opens onto the upper surface of the piston at a point outside of the check valve 328.

Therefore, the fluid passage 322 is active during the piston expansion stroke, i.e. during rebound of the shock absorber. At this time, the check valve 328 prevents fluid flow through the fluid passage 320. On the other hand, during the piston compression stroke, i.e. during bounding movement of the suspension, the fluid passage 320 is active, allowing fluid flow from the lower fluid chamber 318 to the upper fluid chamber 316 and the fluid passage 322 is blocked by the check valve 330.

The piston rod 308 has a hollow cylindrical shape so that a damping force adjusting mechanism, which will be referred to generally by the reference numeral "400" hereafter, can be housed therein. The damping force adjusting mechanism 400 includes a valve mechanism 402 for adjusting the cross-sectional area through which the working fluid can flow between the upper and lower chambers. In the preferred embodiment, the valve mechanism 402 allows three steps of variation of the damping force, i.e., HARD mode, MEDIUM mode and SOFT mode, the narrowest cross-sectional area representing the HARD mode, the widest the SOFT mode and intermediate the MEDIUM mode. Although the preferred embodiment of the invention will be described hereafter in terms of a three-way, adjustable-damping-force shock absorber, the number of adjustable positions of the shock absorber may be increased or decreased as desired and is not limited to this example.

Figure 6:
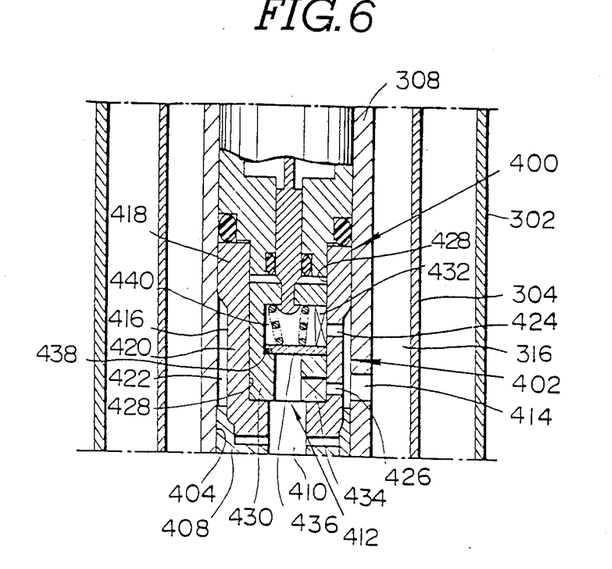
FIG. 6 is an enlarged partial section through the major part of the three-way adjustable shock absorber of FIG. 5.

As shown in FIG. 6, the piston rod 308 defines an axial through opening 404 with the lower end opening into the lower fluid chamber 318. A fitting 408 seals the lower end of the opening 404 of the piston rod and has an axial through opening 410, the axis of which is parallel to the axis of the through opening 404 of the piston rod. Thus, the through openings 404 and 410 constitute a fluid path 412 extending through the piston rod. The piston rod 308 also has one or more radial orifices or openings 414 opening into the upper fluid chamber 316. Thus, the upper and lower fluid chambers 316 and 318 are in communication through the fluid path 412 and the radial orifices 414.

A stationary valve member 416 with a flaring upper end 418 is inserted into the through opening 404 of the piston rod. The outer periphery of the flaring end 418 of the stationary valve member 416 is in sealing contact with the internal periphery of the through opening. The stationary valve member 416 has a portion 420 with a smaller diameter than that of the upper end 418 and so as to define an annular chamber 422 in conjunction with the inner periphery of the through opening 404 of the piston rod. The stationary valve member 416 has two sets of radially extending orifices 424 and 426 and an internal space 428. The radially extending orifices 424 and 426 establish communication between the internal space 428 and the annular chamber 422. A movable or rotary valve member 430 is disposed within the internal space 428 of the stationary valve member 416. The outer periphery of the rotary valve member 430 slidingly and sealingly contacts the inner surface of the stationary valve member 416 to establish a liquid-tight seal therebetween. Radially extending orifices 432 and 34 are defined in the rotary valve member 430 at positions opposite the orifices 424 and 426 of the stationary valve member 416.

Figure 7A:
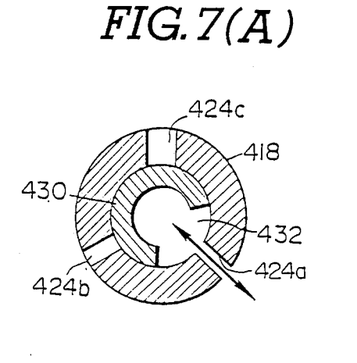
FIGS. 7(A) and 7(B) are further enlarged sections taken along lines A—A and B—B of FIG. 6.
Figure 7B:
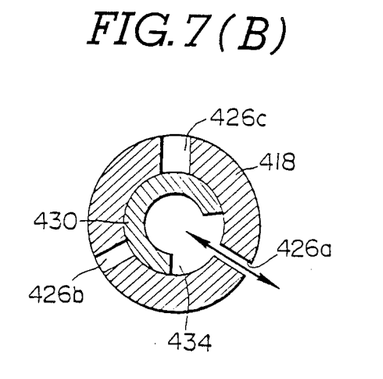

As shown in FIGS. 7(A) and 7(B), the orifices 424 and 426 respectively include first, second and third orifices 424a, 424b, 424c, and 426a, 426b, and 426c. The first orifices 424a and 426a have the narrowest cross-sections and the orifices 432 and 434 are adapted to be in alignment with the first orifices to establish fluid communication between the upper and lower fluid chambers 316 and 318 in the case of the HARD mode. The third orifices 424c and 426c have the widest cross-sections and the orifices 432 and 434 are adatped to be in alignment with the third orifices in the case of the SOFT mode. The cross-sections of the second orifices 424b and 426c are intermediate those of the first and third orifices and the orifices 432 and 424 are adapted to align therewithin the case of the MEDIUM mode.

A check valve 436 is built into the rotary valve member 430. The check valve 436 is normally biased towards a valve seat 438 by means of a bias spring 440 so as to allow one-way fluid flow from the lower fluid chamber to the upper fluid chamber. This causes the bound damping force to be somewhat weaker than the rebound damping force.

Figure 8:
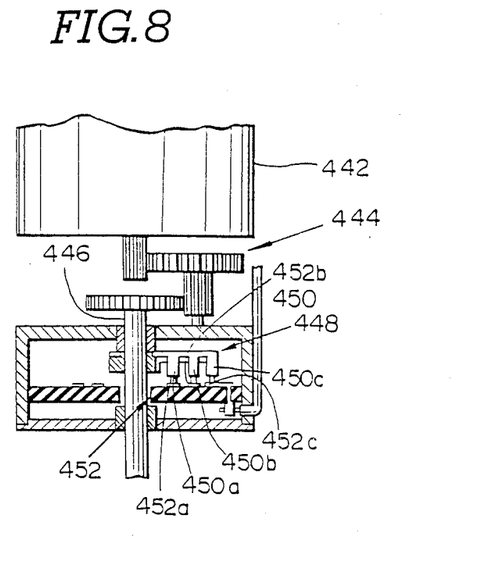
FIG. 8 is a section through the driving arrangement for the three-way adjustable shock absorber of FIG. 5.

The rotary valve member 430 is associated with an electrically operable actuator such as an electrical step motor 442 through a differential gear unit 444 and an output shaft 446 as shown in FIG. 8. A potentiometer 448 is associated with the output shaft 446. The potentiometer 448 includes a movable contact 450 with contactors 450a, 450b and 450c. The contactors 450a, 450b and 450c are adapted to slidingly contact stationary contact elements 452a, 452b and 452c of a stationary contact 452. According to the electrical connections between the movable contact and the stationary contact, the potentiometer 448 produces a mode signal representative of the rotary valve position and thus indicative of the selected mode of the damping force adjusting mechanism. The step motor 442 is electrically connected to the controller 100 to receive the control signal as a mode selector signal which drives the motor 442 through an angle corresponding to the rotary valve movement to the correponding valve position. In this case, the potentiometer will return the mode signal as a feedback signal to indicate the instantaneous valve position.

It should be appreciated that the controller 100 may be operated either in automatic mode or in manual mode.

Returning to FIG. 5, the shock absorber has a fluid reservoir chamber 332 between its inner and outer cylinders 302 and 304, which fluid reservoir chamber 332 is in communication with the lower fluid chamber 318 via the bottom fitting 305 described previously. The bottom fitting 305 may serve to produce damping force in cooperation with the piston and the damping force adjusting mechanism during bounding and rebounding motion of the vehicle. A relatively low pressure pneumatic chamber 336 is also defined between the inner and outer cylinders 302 and 304.

The operation of the damping force adjusting mechanism 400 will be briefly described herebelow with reference to FIG. 7. FIGS. 7(A) and 7(B) show the case of the HAND mode. In this case, the orifice 432 of the rotary valve 430 is in alignment with the orifices 424a and the orifice 434 is in alignment with the orifice 426a. During vehicle rebounding motion, i.e., in the piston compression stroke, the fluid flows from the upper fluid chamber 316 to the lower fluid chamber 318 though the orifice 426a. On the other hand, during vehicle bounding motion, the fluid flows from the lower fluid chamber 318 to the upper fluid chamber 316 through orifices 424a and 426a. Since the first orifices 424a and 426a are the narrowest, the damping force produced in this mode is the highest among the three selectable modes.

In case of the MEDIUM mode, the orifices 432 and 434 of the rotary valve member 430 are respectively in alignment with the second orifices 424b and 426b.

In case of the SOFT mode, the orifices 432 and 434 align with the third orifices 424c and 426c, respectively to cause fluid flow. Since the third orifices 424c and 426c are the widest of the three sets, as described above, the damping force created in this SOFT mode is the lowest.

According to the shown embodiment, the electric step motor 422 is connected to the controller 100 through the driver circuit 102. Similarly to the case of the two-way shock absorber, the controller 100 selects any appropriate damping force state in accordance with detected road surface conditions but in this case produces a three-way control signal for actuating the shock absorber to one of the SOFT, MEDIUM and HARD modes. The driver circuit 102 is responsive to the control signal to drive the step motor 442 to operate the rotary valve member 430 to the corresponding valve position.

As an alternative in the modification set forth above, only SOFT and MEDIUM modes may be used for road-condition-dependent suspension control. Therefore, when the HARD mode is selected in the foregoing first embodiment set forth above the controller 100 actuates the shock absorber to MEDIUM mode.

It should be noted that if different damping forces in the piston expansion stroke and in the compression stroke are preferred, the cross-sectional diameters of the orifices 424a, 424b, 424c may differ from those of the orifices 426a, 426b, and 426c. Alternatively, if an even greater damping force in the expansion stroke in HARD mode is desired, the orifice 424a can be omitted to create a greater flow restriction in the piston expansion stroke.

As shown in FIG. 4, the vehicle height sensor 112 may comprise a cyindrical cover 500 having a lower section overlapping the upper section of the cylinder 200 of the shock absorber 36. The cover 500 is fixed to the piston rod 210 for vertical movement therewith. A detector coil 504 is fitted onto the inner periphery of the cover 500.

Figure 9:
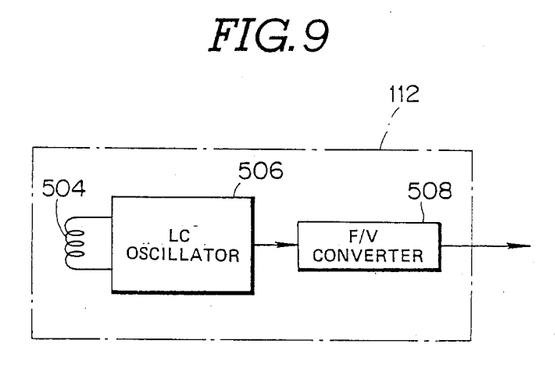
FIG. 9 is a schematic block diagram of a vehicle height sensor employed in the preferred embodiment of the suspension control system of FIG. 3.

As shown in FIG. 9, the detector coil 504 is connected to an LC oscillator 506 and a frequency-to-voltage (F/V) converter 508 to form the vehicle height sensor 112. The vehicle height sensor 112 produces the vehicle height indicative signal having a value representative of the relative displacement between the piston rod 210 and the shock absorber cylinder 200 of the corresponding shock absorber assembly.

Returning to FIG. 3, the controller 100 generally comprises a microprocessor including an input/output interface, an arithmetic circut, such as a CUP, and a memory, such as ROM, RAM, registers and so forth. The controller 100 receives the sensor signals from the steering angle sensor 104, the throttle angle sensor 106, the brake fluid pressure sensor 108, the vehicle speed sensor 110 and the vehicle height sensors $112_{FL}$, $112_{FR}$, $112_{RL}$ and $112_{RR}$ through the interface and feeds control signals to the driver circuits $102_{FL}$, $102_{FR}$, $102_{RL}$ and $102_{RR}$ through the interface.

The arithmetic circuit in the controller 100 adjusts the damping force depending upon the vehicle driving conditions represented by the sensor signals from the aforementioned sensors. Specifically, roll-dependent suspension control is performed in response to the steering angle indicative signal from the steering angle sensor 104. In roll-dependent suspension control, the steering angle indicative signal value is compared with a steering angle threshold which represents a vehicular rolling criterion. The SOFT mode is used as long as the steering angle indicative signal value remains less than or equal to the steering angle threshold. On the other hand, when the steering angle indicative signal value becomes greater than the steering angle threshold, a control signal ordering HARD mode is sent to the variable damping-force shock absorbers 36. As set forth above, in response to the control signal ordering HARD mode, the actuator 24 of the variable damping-force shock absorber 36 is energized to shift the valve body 228 downwardly to block fluid communication through the fluid passage 234 by the extension 230. Hardening the shock absorber in response to steering wheel displacement in excess of a predetermined value ensures roll-stability for better vehicle handling.

On the other hand, the brake fluid pressure indicative signal of the brake fluid pressure sensor 106 adjusts with the fluid pressure in the hydraulic brake circuit. The brake fluid pressure indicative signal is compared with a predetermined brake pressure threshold value to detect vehicular braking. Nose-dive supressive suspension control is performed in accordance with the signal level of the brake fluid pressure indicative signal. Specifically, when the brake fluid pressure indicative signal is below the brake pressure threshold value, the variable damping-force shock absorber 36 is held in SOFT mode. On the other hand, when the brakes are applied and thus the brake fluid pressure indicative signal value exceeds or equals the brake pressure threshold value, the HARD mode of the variable damping-force shock absorber 36 is ordered.

Winding-up suppressive suspension control is similarly performed according to the throttle angle position indicative signal value. First, the throttle valve angular displacement is derived from the throttle angle indicative signal from the throttle angle sensor 108. The throttle valve angular displacement value is then compared with a predetermined acceleration threshold which is representative of a winding-up criterion. As long as the throttle valve angular displacement is less than or equal to the acceleration threshold, the shock absorber 36 is held in SOFT mode. When the throttle valve angular displacement becomes greater than the acceleration threshold, the HARD mode of the shock absorber 36 is ordered.

Bouncing dependent suspension control is performed on the basis of the vehicle height indicative signals from the vehicle height sensors $112_{FL}$, $112_{FR}$, $112_{RL}$ and $112_{RR}$. The average of the vehicle height indicative signal values is use as a measure of the vertical displacement between the vehicle body and the wheel axle. The obtained average value is compared with a predetermined value which is representative of the neutral height position of the vehicle body. The shock absorber is held at SOFT mode as long as the average value remains within a predetermined height range determined about the neutral height position. On the other hand, if the average value should leave the predetermined height range, then the shock absorber is switched to HARD mode.

The controller 100 also includes counters 114, 116, 118, and 120 which count occurrences of switching of the operation mode of the shock absorbers from SOFT mode to HARD mode in response to the suspension control parameters set forth above. Specifically, the counter 114 is used to count how often the operation mode of the shock absorber 36 is switched from SOFT mode to HARD mode in response to steering angular variations exceeding the rolling threshold $L_R$. The counter 114 thus produces a counter signal $N_R$ having a value representative of the number of switches due to substantial rolling of the vehicle. The counter 116 is used to count how often the operation mode of the shock absorber 36 is switched from SOFT mode to HARD mode in response to a brake fluid pressure exceeding the braking fluid pressure threshold $L_N$. The counter 116 thus outputs a counter signal $N_N$ representative of the number of occurrences of nose-dive suppressive suspension control. The counter 118 is used to count occurrences of switching of the operation mode from SOFT mode to HARD mode in response to throttle valve angular displacements exceeding the acceleration threshold $L_S$. The counter 118 produces a counter signal $N_S$ having a value indicative of the number of occurrences of winding-up suppressive suspension control. The counter 120 is used to count the occurrences of switching of the operation mode from SOFT mode to HARD mode in response to vehicle height changes outside of the normal range. The counter 120 produces a counter signal $N_B$ having a value indicative of the number of occurrences of bouncing suppressive suspension control.

Figure 10:
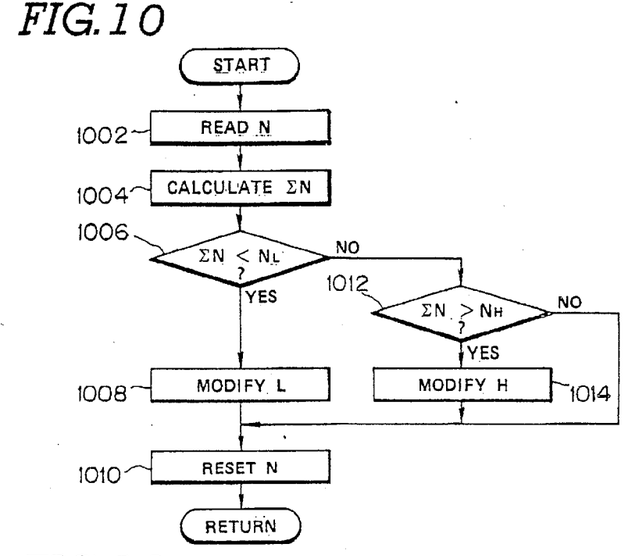
FIG. 10 is a flowchart of a timer-triggered interrupt program for deriving the threshold value or threshold values.

FIG. 10 is a flowchart of a program which derives the threshold values $L_R$, $L_N$, $L_S$ and $L_B$ depending on the frequency of suspension characteristic mode changes.

It should be noted that the program of FIG. 10 is executed as a periodic interrupt program. The counters 114, 116, 118 and 120 are reset each time the program is executed. Therefore, the counter values $N_R$, $N_N$, $N_S$ and $N_B$ represent the number of changes of operational mode of the shock absorber from SOFT mode to HARD mode over one execution period of the program of FIG. 10.

When the program is executed, first the counter values $N_R$, $N_N$, $N_S$ and $N_B$ of the counters 114, 116, 118 and 120 are read out at a step 1002. Then, the sum $\Sigma N$ of the counter values $N_R$, $N_N$, $N_S$ and $N_B$ is calculated at a step 1004. The sum $\Sigma N$ derived at the step 1004 is compared with a lower reference value $N_L$, which is representative of a lower frequency criterion, at a step 1006.

The lower reference value $N_L$ is selected with regard to the expected total mileage over the life of the vehicle or expected lifetime of the vehicle. Specifically, the lower reference value $N_L$ is obtained from the following equation:

$N_L =$ (expected mileage over the life of the vehicle)/(given constant distance), or (expected lifetime)/(given constant driving time)

In other words, the lower frequency criterion represented by the lower reference value $N_L$ is a measure of the minimum possible number of occurrences of switching of operational mode of the shock absorber 36 from SOFT mode to HARD mode under normal conditions within a unit time. The unit time may advantageously match the period of execution of the program of FIG. 10.

Therefore, a sum $\Sigma N$ less than the lower reference value $N_L$ indicates that the actual number of switching occurrences of the shock absorber 36 from SOFT mode to HARD mode is less than the minimum that can be anticipated under normal conditions. This, in turn, means that the sensitivity of the suspension control system is lower than it should be. In order to correct this, the sensitivity of the suspension control system to vehicle driving conditions should be increased. For this purpose, the rolling threshold $L_R$, the brake pressure threshold $L_N$, the acceleration threshold $L_S$ and the normal vehicle height range indicative values $L_B$ should be modified. In practice, in order to achieve higher sensitivity to vehicle driving conditions, the rolling threshold $L_R$, the brake pressure threshold $L_N$ and the acceleration threshold $L_S$ are to be decreased by given values. Also, in order to obtain higher sensitivity, the normal vehicle height range defined by the normal vehicle height range indicative values $L_B$ must be narrowed at a given extent. Modification of the aforementioned thresholds $L_R$, $L_N$, $L_S$ and $L_B$ is performed at a step 1008.

These are various way to modify the thresholds. Specifically, it would be, of course, possible to modify all of the thresholds $L_R$, $L_N$, $L_S$ and $L_B$ by respective given values. Alternatively, it would also be possible to select one of the suspension control parameters represented by the steering angle indicative signal, the brake pressure indicative signal, the throttle angle indicative signal and the vehicle height indicative signals for adjustment according to the count in the correponsding counter 114, 116, 118 or 120. This, in practice, will be the threshold $L_R$, $L_N$, $L_S$ or $L_B$ which corresponds to the largest counter value $N_R$, $N_N$, $N_S$ or $N_B$. Another alternative would be to select the modification values for the various thresholds $L_R$, $L_N$, $L_S$ and $L_B$ in proportion to the corresponding counter values $N_R$, $N_N$, $N_S$ and $N_B$.

After modifying the thresholds $L_R$, $L_N$, $L_S$ and $L_B$, the program goes to a step 1010 in which it resets all of the counters 114, 116, 118 and 120 to zero. Control then returns to the main program which can then control the suspension utilizing the modified thresholds.

On the other hand, when the sum $\Sigma N$ is greater than or equal to the lower reference value $N_L$ when checked at the step 1006, then, the sum $\Sigma N$ is compared with an upper reference value $N_H$ at a step 1012.

As with the lower reference value $N_L$ set forth above, the upper reference value $N_H$ is determined in relation to the expected mileage over the life of the vehicle or expected lifetime of the vehicle. The upper reference value $N_H$ is representative of an upper criterion of the greatest possible number of switching occurrences from SOFT mode to HARD mode in the shock absorber 36, under normal conditions. Specifically, when the rate of switching of operational mode of the shock absorber 36 from SOFT mode to HARD mode is too high, it means the suspension control is excessively sensitive to vehicle conditions. Therefore, in this case, the sensitivity must be lowered to normalize suspension control.

Therefore, when the sum $\Sigma N$ is greater than the upper threshold value $N_H$, the thresholds $L_R$, $L_N$, $L_S$ and $L_B$ are modified so as to lower the sensitivity at a step 1014. This modification may be substantially the same as discussed with reference to the step 1008. However, in the step 1014, the threshold values $L_R$, $L_N$, $L_S$ and $L_B$ are raised to lower sensitivity.

After the step 1014, the program goes to the step 1010 in which it clears the counter values $N_R$, $N_N$, $N_S$ and $N_B$ in the counters 114, 116, 118 and 120.

On the other hand, a sum $\Sigma N$ is less than or equal to the upper threshold at the step 1012 indicates that the sensitivity of the suspension control system is at a suitable level. Accordingly, the thresholds $L_R$, $L_N$, $L_S$ and $L_B$ need not be adjusted. Therefore, in this case, the program jumps from the step 1012 to the step 1010 which clears the counter values $N_R$, $N_N$, $N_S$ and $N_B$.

It should be appreciated that although the foregoing disclosure is directed to modification of the rolling threshold $L_R$ for rolling suppressive control, the brake pressure threshold $L_N$ for nose-dive suppressive suspension control, the acceleration threshold $N_S$ for winding-up suppressive suspension control and the normal vehicle height range indicative values $L_B$ for bouncing suppressive control, other threshold values may be modified to normalize suspension control characteristics.

Figure 11:
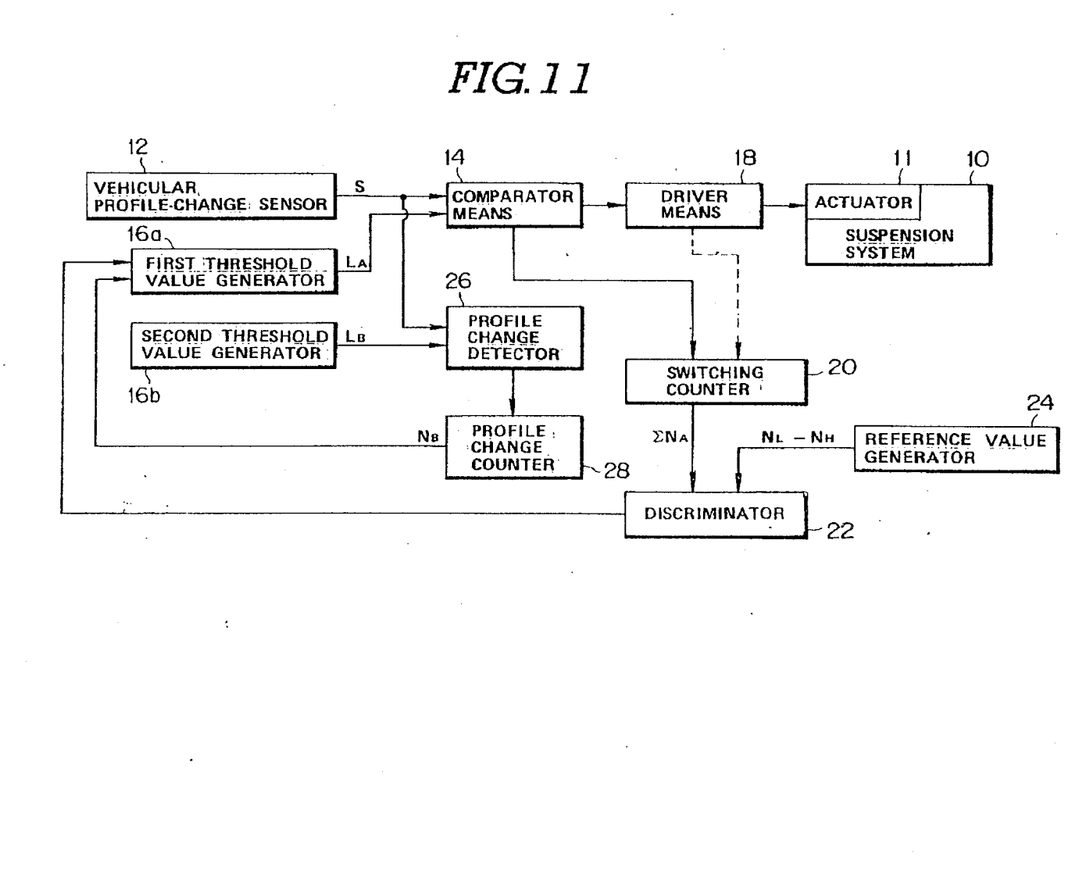
FIG. 11 is a schematic block diagram of another embodiment of a vehicle suspension control system according to the invention.

FIG. 11 is a block diagram of another embodiment of the suspension control system according to the invention. In this embodiment, vehicular profile changes exceeding a predetermined magnitude are detected and counted. The counted number of occurrences of such excessive vehicular profile change is utilized in deciding how to modify the rolling threshold $L_R$, the brake pressure threshold $L_N$, the acceleration threshold $L_S$ and the normal vehicular height indicative values $L_B$.

In order to implement the above-mentioned suspension control, particularly derivation of the threshold values, a first reference signal generator means 16a produces a reference signal representative of at least one of the rolling threshold $L_R$, the brake pressure threshold $L_N$, the acceleration threshold $L_S$ and the normal vehicle height range indicative values $L_B$, and a second reference signal generator 16b produces a second reference signal representative of at least one of a roll profile change reference value $L_r$, a nose-dive reference value $L_n$, a winding-up reference value $L_s$ and a bouncing reference value $L_b$. The roll profile change reference value $L_r$, the nose-dive reference value $L_n$, the winding-up reference value $L_s$ and the bouncing reference values are all set to fixed values smaller than the roll threshold $L_A$, the brake pressure threshold $L_N$, the acceleration threshold $L_S$ and the normal vehicle height range indicative value $L_B$, respectively.

The first reference signal generator means 16a outputs the first reference signal to the comparator means 14. The comparator 14 works in essentially the same manner as disclosed with respect to the first embodiment of the invention. The comparator signal generated when the sensor signal value is greater than the first reference signal value is sent to the switching counter 20 as is disclosed with respect to FIG. 1.

The second reference signal generator means 16b is connected to a profile change detector 26. The profile change detector 26 is also connected to the profile-change sensor means 12 to receive the sensor signal. The profile change detector 26 compares the second reference signal value with the sensor signal value and produces a detector signal when the sensor signal value is greater than the second reference signal value. The detector signal of the profile change detector 26 is sent to a profile change counter 28. The profile change counter 28 counts the detector signal pulses and outputs a profile change counter signal to the first reference signal generator means 16a.

The first reference signal generator means 16a modifies the first reference signal value, which is representative of at least one of the rolling threshold $L_R$, the brake pressure threshold $L_N$, the acceleration threshold $L_S$ and the normal vehicle height range indicative values, on the basis of the profile change counter signal value, when the discriminate signal from the discriminator 24 is input.

The derivation of the threshold values will be described in detail herebelow with respect to a program illustrated in FIG. 12 and corresponding to that in FIG. 10.

As in the previous embodiment, the switching counter 20 counts occurrences of switching of operational mode from SOFT mode to HARD mode due to each of the suspension control parameters separately, e.g. vehicular roll as indicated by a steering angle indicative signal value exceeding the rolling threshold $L_R$, braking pressure as indicated by a brake fluid pressure indicative signal value exceeding the brake pressure threshold $L_N$, vehicular acceleration as indicated by a throttle angle indicative signal value exceeding the acceleration threshold $L_S$, and vehicular bounce as indicated by a vehicle height indicative signal value outside of the normal vehicle height range defined by the normal vehicle height range indicative values $L_B$. The counter value $N_R$ in the switching counter 20 represents the number of occurrences of the switching of operational mode from SOFT mode to HARD mode due to a steering angle exceeding the roll criterion represented by the roll threshold $L_R$. The counter value $N_N$ represents the number of occurrences of the SOFT-to-HARD mode change due to braking detected by detecting when the brake fluid pressure exceeds the brake pressure threshold $L_N$. The counter value $N_S$ represents the number of occurrences of operational mode switching due to throttle valve angular displacement greater than the acceleration threshold $L_S$. The counter value $N_B$ represents the number of occurrences of switching of operational mode of the shock absorber due to vehicular vertical displacement outside of the normal range defined by the normal vehicle height indicative values $L_B$.

Similarly, the profile change counter 28 counts occurrences of vehicular profile change due to roll exceeding the roll profile change reference value $L_r$, nose-dive to an extent greater than the nose-dive reference value $L_n$, winding-up to an extent greater than the winding-up reference value $L_s$, and bounce outside of the bouncing range defined by the bouncing reference values $L_b$. The counter value $N_r$ represents the number of occurrences of vehicular roll exceeding a rolling criterion defined by the rolling reference value $L_r$. The counter value $N_n$ represents the number of occurrences of excessive vehicular nose-dive. The counter value $N_s$ represents the number of occurrences of excessive vehicular winding-up. The counter value $N_b$ represents the number of occurrences of vehicular bounce outside of a bouncing range defined by the bouncing reference values $L_b$.

Figure 12:
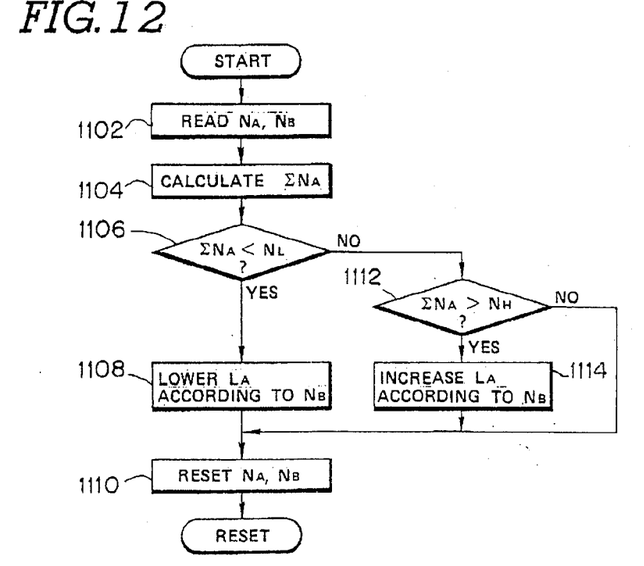
FIG. 12 is a flowchart of a modified timer-triggered interrupt program for deriving the threshold values.

In the program of FIG. 12, the counter values $N_R$, $N_N$, $N_S$ and $N_B$ in the switching counter 20 and the counter values $N_r$, $N_n$, $N_s$ and $N_b$ in the profile change counter 28 are read out at a step 1102. The sum $\Sigma N$ of the counter values $N_R$, $N_N$, $N_S$ and $N_B$ is derived at a step 1104. The sum $\Sigma N$ is compared with the lower reference value $N_L$ at a step 1106. If the sum $\Sigma N$ is less than the lower reference value $N_L$, the roll threshold $L_R$, the brake pressure threshold $L_N$, the acceleration threshold $L_S$ and the normal vehicle height range indicative values $L_B$ are modified to increase the sensitivity of the suspension control system. Toward this end, the rolling threshold $L_R$, the brake pressure threshold $L_N$ and the acceleration threshold $L_S$ are decreased by a given value. Also, the normal vehicle height range will be narrowed by modifying the normal vehicle height range indicative values $L_B$. The modification values of the roll threshold $L_R$, the brake pressure threshold $L_N$, the acceleration threshold $L_S$ and the normal vehicle height indicative values $L_B$ can be derived in proportion to the corresponding counter values $N_r$, $N_n$, $N_s$ and $N_b$ of the profile change counters 28.

The threshold values are modified when necessary at a step 1108. After the step 1108, the counter values in the switching counter 20 and the profile change counter 28 are cleared at a step 1110.

On the other hand, when the sum $\Sigma N$ is greater than or equal to the lower reference value $N_L$ when checked at the step 1106 the sum $\Sigma N$ is compared with the upper reference value $N_H$ at a step 1112. If the sum $\Sigma N$ is greater than the upper reference value $N_H$, the roll threshold value $N_R$, the brake pressure threshold value $L_N$, the acceleration threshold value $L_S$ and the normal vehicle height range indicative values $L_B$ are modified to lower the sensitivity of the suspension system at a step 1114. Similar to the modification performed in the step 1108, the modification values of the thresholds are determined in proportion to the corresponding counter values $N_r$, $N_n$, $N_s$ and $N_b$.

After the step 1114, the counter values in the switching counter 20 and the profile change counter 28 are cleared at the step 1110.

When the sum $\Sigma N$ is less than or equal to the upper reference value $N_H$ when checked at the step 1112, then contjrol goes directly to the step 1110, which clears the counter values.

As will be appreciated herefrom, according to the present invention, the sensitivity of the suspension control system can be held to within a predetermined normal or standard range so as to ensure acceptable performance throughout the life of the vehicle.

It should be appreciated that, though the present invention has been disclosed in terms of a two-way variable damping force shock absorber, the concept of checking the number of times the suspension mode in changed may also be applied to systems using three-way variable damping force shock absorbers as disclosed with reference to FIGS. 5 to 8. Furthermore, variable damping characteristics suspension system can be made up not only of variable damping force shock absorbers but also of variable stabilizers or variable spring-constant pneumatic springs. Even in these cases, the present invention can be used to ensure the desired suspension control performance.

What is claimed is:

1. An automotive vehicle suspension control system comprising:
    a vehicular suspension system with damping characteristics variable at least between a first mode and a second mode, the latter of which provides harder damping characteristics than said first mode, in response to a control signal;
    a sensor monitoring a preselected suspension control parameter and producing a sensor signal having a value indicative of a vehicular driving condition represented by said preselected suspension control parameter;
    first means for comparing said sensor signal value with a threshold value and producing said control signal ordering said vehicular suspension system from said first mode to said second mode when said sensor signal value is greater than said threshold value;
    second means for counting occurrences of said control signal ordering said vehicular suspension system from said first mode to said second mode and producing a counter signal having a value representative of the counted value; and
    third means for detecting when said counter signal exceeds a first reference value and in such cases, modifying said threshold value so as to lower the sensitivity of suspension control to said sensor signal.

2. An automotive vehicle suspension control system as set forth in claim 1 wherein said third means also detects when said counter signal has a value smaller than a second reference value and in such cases, modifies said threshold value to increase the sensitivity of suspension control to said sensor signal.

3. An automotive vehicle suspension control system as set forth in claim 1 wherein said second means is adapted to be reset periodically to clear its counter value.

4. An automotive vehicle suspension control system as set forth in claim 3 wherein said first reference value is representative of the greatest possible number of occurrences of said control signal ordering said vehicular suspension system from said first mode to said second mode within a counting period defined by the reset-timing of said second means.

5. An automotive suspension control system as set forth in claim 2 wherein said second means is assigned a given counting period and is adapted to be reset to clear its counter value at the end of every said counting period, and said second reference value is representative of the lowest possible number of occurrences of said control signal ordering said vehicular suspension system from said first mode to said second mode within said counting period.

6. An automotive vehicle suspension control system as set forth in claim 4 wherein said third means also detects when said counter signal has a value smaller than a second reference value which is smaller than said first reference value and in such cases increases the sensitivity of suspension control to said second signal, said second reference value being representative of the lowest possible number of occurrences of said control signal ordering said vehicular suspension system from said first mode to said second mode within said counting period of said second means.

7. An automotive vehicle suspension control system as set forth in claim 6 wherein the sensitivity of suspension control is lowered by said third means by increasing said first reference value by a first given value.

8. An automotive vehicle suspension control system as set forth in claim 7 wherein the sensitivity of suspension control is increased by said third means by decreasing said threshold value by a second given value.

9. An automotive vehicle suspension control system as set forth in claim 8 which further comprises fourth means for comparing said sensor signal value with an auxiliary threshold value, counting occurrences of said sensor signal values exceeding said auxiliary threshold value, and producing an auxiliary counter signal indicative of the counted value, and said third means derives said first given value on the basis of said auxiliary counter signal value.

10. An automotive vehicle suspension control system as set forth in claim 9 wherein said third means also derives said second given value on the basis of said auxiliary counter signal value.

11. An automotive vehicle suspension control system comprising:
 a vehicular suspension system with damping characteristics variable at least between a first mode and a second mode, the latter of which provides harder damping characteristics than said first mode, in response to a control signal;
 a first sensor monitoring a preselected first suspension control parameter and producing a sensor signal having a value indicative of a vehicle driving condition represented by said first suspension control parameter;
 a second sensor monitoring a preselected second suspension control parameter and producing a second sensor signal having a value indicative of a vehicle driving condition represented by said second suspension control parameter;
 first means for comparing said first sensor signal value with a first threshold value and producing said control signal ordering said vehicular suspension system from said first mode to said second mode when said first sensor signal value is greater than said first threshold value;
 second means for comparing said second sensor signal value with a second threshold value and producing said control signal ordering said vehicular suspension system from said first mode to said second mode when said second sensor signal value is greater than said second threshold value;
 third means for detecting said control signal produced by said first means, counting occurrences of said control signal, and producing a first counter signal;
 fourth means for detecting said control signal produced by said second means, counting occurrences of said control signal, and producing a second counter signal;
 fifth means for comparing the sum of said first and second counter signal values with a first reference value and modifying at least one of said first and second threshold values when said sum is greater than said first reference value.

12. An automotive vehicle suspension control system as set forth in claim 11 said fifth means for comparing said sum with a second reference value and modifying at least one of said first and second threshold values when said sum is less than said second reference value.

13. An automotive vehicle suspension control system as set forth in claim 11 wherein said fifth means modifies one of said first and second threshold values depending on which of said first and second counter signal values is greater than the other when said sum is greater than said first reference value.

14. An automotive vehicle suspension control system as set forth in claim 12 wherein said fifth means modifies one of said first and second threshold values depending on which of said first and second counter signal values is less than the other when said sum is smaller than said second reference value.

15. An automotive vehicle suspension control system as set forth in claim 12 wherein said fifth means modifies both said first and second threshold values by increments derived in proportion to said first and second counter signal values.

16. An automotive vehicle suspension control system as set forth in claim 12 wherein said third and fourth means are reset at given regular intervals to clear said first and second counter values to zero.

17. An automotive vehicle suspension control system as set forth in claim 16 wherein said first and second reference values define a desired normal sensitivity range of suspension control for said automotive vehicle suspension control system.

* * * * *